(12) United States Patent
Chen et al.

(10) Patent No.: US 10,889,517 B2
(45) Date of Patent: Jan. 12, 2021

(54) NANOMETER PHOTOCATALYST-MICROBE COMPOSITE MULTILAYER LIGHT TRANSMISSION COMBINATION CARRIER

(71) Applicant: HOHAI UNIVERSITY, Jiangsu (CN)

(72) Inventors: Juan Chen, Jiangsu (CN); Peifang Wang, Jiangsu (CN); Chao Wang, Jiangsu (CN); Yanhui Ao, Jiangsu (CN); Han Gao, Jiangsu (CN)

(73) Assignee: HOHAI UNIVERSITY, Jiangsu (CN)

( * ) Notice: Subject to any disclaimer, the term of this patent is extended or adjusted under 35 U.S.C. 154(b) by 0 days.

(21) Appl. No.: 16/320,036

(22) PCT Filed: Oct. 17, 2017

(86) PCT No.: PCT/CN2017/106494
§ 371 (c)(1),
(2) Date: Jan. 23, 2019

(87) PCT Pub. No.: WO2019/006908
PCT Pub. Date: Jan. 10, 2019

(65) Prior Publication Data
US 2020/0115263 A1 Apr. 16, 2020

(30) Foreign Application Priority Data
Jul. 6, 2017 (CN) .......................... 2017 1 0544697

(51) Int. Cl.
*C02F 3/10* (2006.01)
*C02F 3/00* (2006.01)
(Continued)

(52) U.S. Cl.
CPC ................ *C02F 3/34* (2013.01); *C02F 3/101* (2013.01); *C02F 3/348* (2013.01);
(Continued)

(58) Field of Classification Search
CPC .. C02F 3/34; C02F 2003/001; C02F 2101/30; C02F 2203/006; C02F 2303/14; C02F 2305/10; C02F 3/348
See application file for complete search history.

(56) References Cited

U.S. PATENT DOCUMENTS

| 4,165,281 A | * | 8/1979 | Kuriyama | ................ C02F 3/10 210/150 |
| 7,067,055 B2 | * | 6/2006 | Ruppel | ................... C02F 3/006 210/85 |

(Continued)

FOREIGN PATENT DOCUMENTS

| CN | 2699172 Y | 5/2005 |
| CN | 102424482 A | 4/2012 |

(Continued)

OTHER PUBLICATIONS

International Search Report for corresponding International Application No. PCT/CN2017/106494 dated Apr. 12, 2018.
(Continued)

*Primary Examiner* — Nam X Nguyen
*Assistant Examiner* — Julia L. Wun
(74) *Attorney, Agent, or Firm* — Pearne & Gordon LLP (57) ABSTRACT

Provided is a nano-photocatalyst-microorganism composite multilayered light-transmitting combination support, comprising a plurality of wave-shaped plexiglass plates (1), a tandem rod holder (4), hollow elastic spacers (5), and fixing screws (6); each of the wave-shaped plexiglass plates (1) is provided with four fixing holes (7); the tandem rod holder (4) is provided with four tandem rods (8), and the four tandem rods (8) pass through the fixing holes (7); the tandem rods (8) between the two adjacent wave-shaped plexiglass plates (1) pass through the hollow elastic spacers (5); each of the tandem rods (8) is provided with a fixing screw (6) at the top end; each of the wave-shaped plexiglass plates (1)
(Continued)

have different loading layers on the upper and lower surfaces, with a nano-photocatalyst-loading layer (2) on one surface and a degrading bacteria-loading layer (3) on the other surface. Also provided is a method of making the nano-photocatalyst-microorganism composite multilayered light-transmitting combination support.

5 Claims, 3 Drawing Sheets

(51) Int. Cl.
  *C02F 3/34* (2006.01)
  *C02F 103/00* (2006.01)
(52) U.S. Cl.
  CPC .. *C02F 2003/001* (2013.01); *C02F 2103/007* (2013.01); *C02F 2203/006* (2013.01); *C02F 2305/08* (2013.01); *C02F 2305/10* (2013.01)

(56) References Cited

U.S. PATENT DOCUMENTS

| | | | | |
|---|---|---|---|---|
| 7,815,357 | B2* | 10/2010 | Hayashi | G02B 6/0038 |
| | | | | 362/606 |
| 8,388,844 | B2* | 3/2013 | Marsolek | C02F 1/30 |
| | | | | 210/617 |
| 2010/0176067 | A1* | 7/2010 | Boyd | C02F 1/325 |
| | | | | 210/748.09 |
| 2013/0299412 | A1* | 11/2013 | Masutani | C02F 1/44 |
| | | | | 210/321.84 |
| 2016/0107912 | A1* | 4/2016 | Novak | C12M 23/40 |
| | | | | 210/603 |

FOREIGN PATENT DOCUMENTS

| | | | | |
|---|---|---|---|---|
| CN | 102701317 | A | | 10/2012 |
| CN | 102728222 | A | | 10/2012 |
| CN | 103508638 | A | | 1/2014 |
| CN | 104701561 | A | | 6/2015 |
| CN | 105428663 | A | | 3/2016 |
| CN | 106927695 | A * | | 7/2017 |
| CN | 107162220 | A | | 9/2017 |
| EP | 0923988 | A1 * | 6/1999 | ............ B01J 35/004 |
| EP | 2 409 954 | A | | 1/2012 |
| JP | H04-281789 | A * | | 10/1992 |
| WO | 2008/121078 | A1 | | 10/2008 |

OTHER PUBLICATIONS

Written Opinion for corresponding International Application No. PCT/CN2017/106494 dated Apr. 12, 2018.
Chinese Office Action dated Mar. 11, 2020 for corresponding Chinese Application No. 2017105446972.
Chinese Search Report dated Mar. 11, 2020 for corresponding Chinese Application No. 2017105446972.

* cited by examiner

NANOMETER PHOTOCATALYST-MICROBE COMPOSITE MULTILAYER LIGHT TRANSMISSION COMBINATION CARRIER

CROSS REFERENCE TO RELATED APPLICATION

This application is a 371 of International Application No. PCT/CN2017/106494 filed on Oct. 17, 2017 and claims priority to Chinese Patent Application No. 201710544697.2 entitled NANO-PHOTOCATALYST-MICROORGANISM COMPOSITE MULTILAYERED LIGHT-TRANSMITTING COMBINATION SUPPORT, as filed on Jul. 6, 2017, which are incorporated herein by reference for all purposes.

FIELD OF THE INVENTION

The disclosure relates to a material for removing organic pollution in water body with high efficiency and low cost, which can be repeatedly used for many times; particularly, the disclosure relates to a nano-photocatalyst-microorganism composite multilayered light-transmitting combination support, and belongs to the technical field of organic pollution control.

BACKGROUND OF THE INVENTION

Water pollution has become one of the primary environmental issues currently threatening the safety of water ecosystems and human health. A variety of organic pollutants, such as organic agricultural chemicals, polycyclic aromatic hydrocarbons and polybrominated diphenyl ethers, have been detected out in rivers, lakes, farmland water body, especially in some economically developed areas where many organic pollutants are present at high pollution levels. How to rapidly, economically, effectively and sustainably remove organic pollutants from water body is a hot and difficult point of research in the current water pollution remediation and control.

Microbial degradation and nano-photocatalysis are two methods for controlling organic pollution in water body, which have attracted much attention in recent years. Microbial degradation has advantages of non-toxicity, high efficiency, easy operation, economical and wide application, and domestic and overseas researchers have obtained by domestication and screening degrading strains with specific degradation effects on various organic pollutants from environment samples. Nano-photocatalysts, such as titanium dioxide, can remove organic pollutants in water body by utilizing the strong redox performance of photogenerated electron-hole pairs under visible or ultraviolet light. As degrading bacteria are mostly in a free state and nano-photocatalysts are solid powders, there are problems of difficult recovery, easy deactivation, low recycling rate, risk of secondary pollution, and the like in actual water pollution remediation. To solve these problems, people have attempted to load degrading bacteria or nano-photocatalysts on some decontamination supports, such as porous minerals, biochar materials and fibers, but some aspects remain to be broken through as to how to enhance adhesion or coupling intensity of the degrading bacteria or nano-photocatalysts to the decontamination supports, how to reduce its loss during the remediation process, and the like. It should be particularly pointed out that, as the strong free radicals generated by the photocatalytic reaction can inactivate the microorganisms on the decontamination supports, microbial degradation and nano-photocatalytic degradation cannot function simultaneously, which greatly limits the combined application of the two major approaches of water pollution remediation and restricts the development of technologies of organic pollution remediation in water body. In addition, the decontamination supports commonly used in current water ecological remediation, such as porous minerals and biochar materials, have poor light transmittance. Nano-photocatalysts, after being loaded, can only act on the surface, but cannot initiate photocatalytic reaction in the inner voids due to lack of illumination, which also becomes a major problem that limits the application of nano-photocatalysts in the organic pollution remediation in water body. In addition, most of the existing decontamination materials require energy-consuming and time-consuming complex preparation processes such as high-temperature calcination, and it is difficult to recycle for multiple times. Thus, there is a need to develop an efficient, low-cost, simple and reusable nano-photocatalyst-microorganism synergistic decontamination support.

SUMMARY OF THE INVENTION

The disclosure provides a nano-photocatalyst-microorganism composite multilayered light-transmitting combination support, for the purpose of solving the problems such as poor light transmittance of the existing decontamination supports, difficult co-existence of microorganisms and nano-photocatalysts, and low loading intensity, especially addressing the drawbacks that the loading process is complicated, high-cost and time-consuming, and that the material is difficult to be recycled for multiple times. The performances of photocatalytic degradation and microbial degradation of the decontamination supports are improved, and the organic pollutants in water body are finally removed efficiently.

The technical solution of the disclosure provides a nano-photocatalyst-microorganism composite multilayered light-transmitting combination support, comprising: a plurality of wave-shaped plexiglass plates 1, a tandem rod holder 4, hollow elastic spacers 5, and fixing screws 6; wherein the plurality of wave-shaped plexiglass plates 1 are arranged in parallel and each of the wave-shaped plexiglass plates 1 is provided with four fixing holes 7; the tandem rod holder 4 is provided with four tandem rods 8, and the four tandem rods 8 pass through corresponding fixing holes 7 in each of the wave-shaped plexiglass plates 1 arranged in parallel, respectively; the tandem rods 8 between two adjacent wave-shaped plexiglass plates 1 pass through the hollow elastic spacers 5; each of the tandem rods 8 is provided with a fixing screw 6 at the top end; and each of the wave-shaped plexiglass plates 1 has different loading layers on the upper and lower surfaces, with a nano-photocatalyst loading layer 2 on one surface and a degrading bacteria loading layer 3 on the other surface.

A method of making the above support includes steps of:

(1) hot press molding and surface roughening of plexiglass plate;

(2) formation of a nano-photocatalyst-loading layer 2 by loading two layers of films;

(3) formation of a degrading bacteria-loading layer 3 by loading degrading bacteria;

(4) assembly by stacking of multiple layers of plexiglass plates; and (5) support securement and interlayer spacing adjustment.

The disclosure has the following advantages:

1) the nano-photocatalyst-microorganism composite multilayered light-transmitting combination support proposed by the disclosure is composed of multiple layers of wave-shaped plexiglass plates, thereby increasing the contact area with polluted water body;

2) the decontamination support is light transmissible, and thus the nanophotocatalyst in the support is fully exposed to light and degrades pollutants in water body by photocatalytic reaction;

3) the nano-photocatalyst and the microorganism are precisely separated to avoid the influence of the nano-photocatalyst on growth of the microorganism, and the photocatalytic degradation zone and the microbial degradation zone in the decontamination support, present in a separate way, function simultaneously without affecting each other, thereby significantly improving efficiency of removing organic pollutants from water body;

4) the number of the stacked layers can be flexibly adjusted according to actual needs, and the interlayer spacing of the decontamination support can be adjusted by the elasticity of the hollow elastic spacer; and 5) the raw materials are easily available, and the preparation process is simple and has low energy consumption and low cost; and the used plates can be disassembled, washed, and be repeatedly used for many times.

BRIEF DESCRIPTION OF THE DRAWINGS

In the drawings, 1 is a wave-shaped plexiglass plate, 2 is a nano-photocatalyst-loading layer, 3 is a degrading bacteria-loading layer, 4 is a tandem rod holder, 5 is a hollow elastic spacer, 6 is a fixing screw, 7 is a fixing hole, 8 is a tandem rod, 9 is a thread interface, 10 is a nanophotocatalyst-microorganism composite multilayer light transmissive support, and 11 is a water-permeable cage.

DETAILED DESCRIPTION OF EMBODIMENTS

Provided is a nanophotocatalyst-microorganism composite multilayered light-transmitting combination support, comprising: a plurality of wave-shaped plexiglass plates 1, a tandem rod holder 4, hollow elastic spacers 5, and fixing screws 6; wherein the plurality of wave-shaped plexiglass plates 1 are arranged in parallel and each of the wave-shaped plexiglass plates 1 is provided with four fixing holes 7; the tandem rod holder 4 is provided with four tandem rods 8, and the four tandem rods 8 pass through corresponding fixing holes 7 in each of the wave-shaped plexiglass plates 1 arranged in parallel, respectively; the tandem rods 8 between two adjacent wave-shaped plexiglass plates 1 pass through the hollow elastic spacers 5; each of the tandem rods 8 is provided with a fixing screw 6 at the top end; and each of the wave-shaped plexiglass plates 1 have different loading layers on the upper and lower surfaces, with a nano-photocatalyst-loading layer 2 on one surface and a degrading bacteria-loading layer 3 on the other surface.

Figure 3:
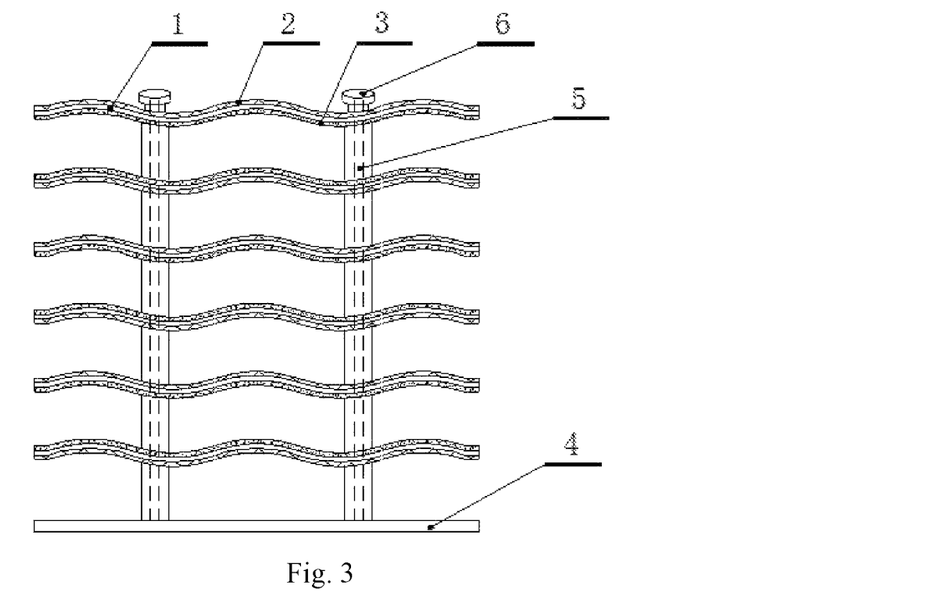
FIG. 3 is a schematic longitudinal sectional view of the invention.

The opposite surfaces of two adjacent wave-shaped plexiglass plates 1 have the same loading layers. A photocatalytic degradation zone is formed between two opposite nanophotocatalyst-loading layers 2, and a microbial degradation zone is formed between two opposite degrading bacteria-loading layers 3. After assembly by stacking, the photocatalytic degradation zone and the microbial degradation zone are present in a separate way throughout the nano-photocatalyst-microorganism composite multilayered light-transmitting combination support.

Figure 4:
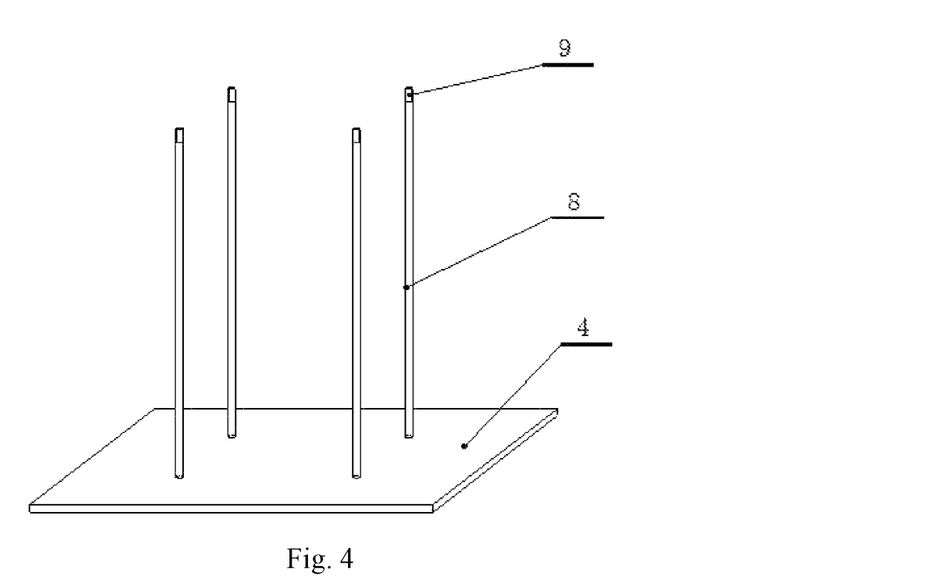
FIG. 4 is a schematic view of the tandem rod holder of the invention.

Each of the tandem rods 8 has a thread interface 9 at the top end, through which the fixing screw 6 is fixed to the top end of the tandem rod 8.

Figure 1:
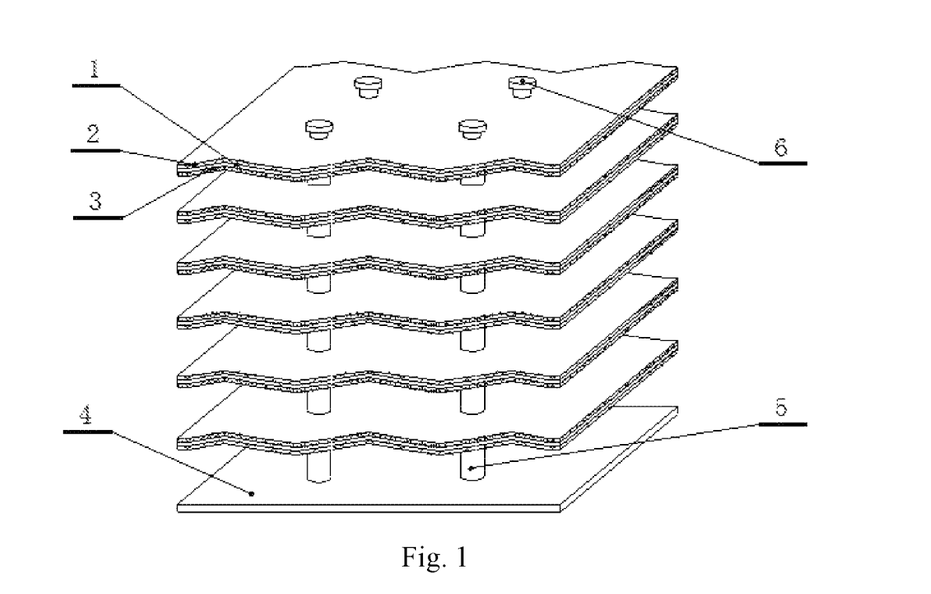
FIG. 1 is a schematic perspective view of the structure of the invention.

The plurality of wave-shaped plexiglass plates 1 are 4 to 10 layers of wave-shaped plexiglass plates 1.

A method of making the nano-photocatalyst-microorganism composite multilayered light-transmitting combination support includes steps of:

(1) hot press molding and surface roughening of plexiglass plate;

(2) formation of a nano-photocatalyst-loading layer 2 by loading two layers of films;

(3) formation of a degrading bacteria-loading layer 3 by loading degrading bacteria;

(4) assembly by stacking of multiple layers of plexiglass plates; and (5) support securement and interlayer spacing adjustment.

Figure 2:
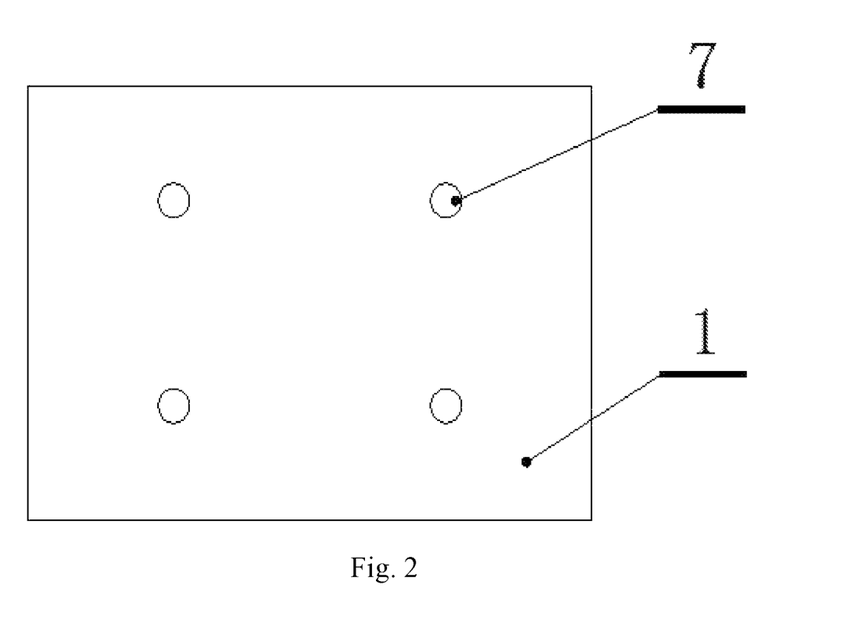
FIG. 2 is a schematic top plan view of the invention.

The hot press molding and surface roughening of plexiglass plate of step (1) includes: hot pressing a plexiglass plate in a mold into a wave shape, cutting the wave-shaped plexiglass plate into wave-shaped plexiglass plate square pieces, roughening by sand blasting the upper and lower surfaces of the wave-shaped plexiglass plate square pieces; and cutting the wave-shaped plexiglass plate square pieces roughened by sandblasting at the four corners into circular fixing holes 7.

The size and shape of the plexiglass plate square pieces as cut may be adjusted according to actual needs, and the plexiglass plate square pieces are preferably wave-shaped plexiglass plate square pieces having a length of 30 cm and a width of 30 cm.

The formation of a nanophotocatalyst-loading layer by loading two layers of films of step (2) includes: ultrasonically cleaning the roughened wave-shaped plexiglass plate square pieces with dilute nitric acid, absolute ethanol and pure water sequentially at an ultrasonic frequency of 40 KHz and at a temperature of 35° C., each for 20 min; air drying the ultrasonically-cleaned wave-shaped plexiglass plate square pieces at room temperature; and then firstly applying a layer of $SiO_2$ on one surface of the wave-shaped plexiglass plate square pieces by mechanical painting to increase the adhesion intensity of the nano-photocatalyst followed by applying a nano-photocatalyst on the wave-shaped plexiglass plate square pieces at normal temperature and pressure by a plurality of consecutive surface paintings; prior to rinsing with water and drying at room temperature.

The nano-photocatalyst is preferably anatase $TiO_2$ nanoparticles.

The formation of a degrading bacteria-loading layer 3 by loading degrading bacteria of step (3) includes: preparing a liquid medium, cultivating selected degrading bacteria on a large scale, collecting the degrading bacteria by low-speed centrifugation for 5 min to 15 min, mixing uniformly the degrading bacteria with a fixing agent at a mass-to-volume ratio of 1:10 (namely, adding 1 g (bacterial fresh weight) of the degrading bacteria into 10 ml of the fixing agent), and loading the degrading bacteria on the other surface of the wave-shaped plexiglass plate square pieces through a plurality of consecutive surface paintings prior to drying at room temperature.

The degrading bacteria are selected according to the targeted organic pollutants, and the degrading bacteria having high-efficiency degradation effect on the targeted organic pollutants are selected. The fixing agent is preferably a 2% sodium alginate solution.

The low-speed centrifugation refers to the centrifugation performed at a rotational speed of less than 2500 rpm.

The degrading bacteria may be an indigenous microbial flora, which remove pollutants with its self-remediation ability. In such case, the other surface of the plexiglass plate is selected to be coated with a single layer of the fixing agent. After multiple layers of the plexiglass plates are assembled by stacking and placed in water body, the indigenous microorganisms adhere to the fixing agent, grow and form a biofilm, thereby degrading pollutants in water body.

Figure 5:
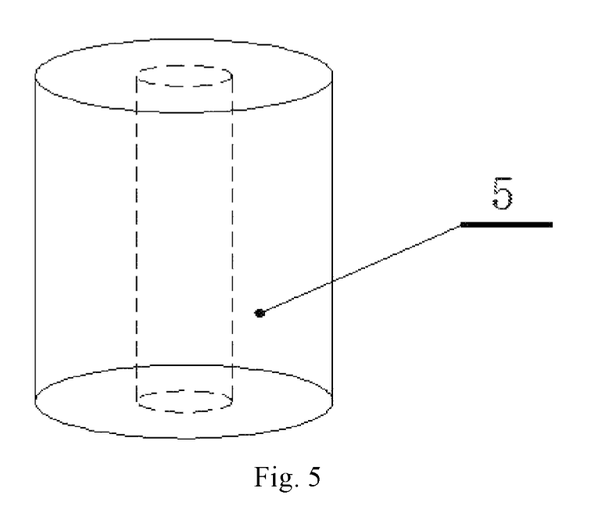
FIG. 5 is a schematic view of a hollow elastic spacer of the invention.

The assembly by stacking of multiple layers of plexiglass plates of step (4) includes: assembling by stacking a plurality of the plexiglass plates loaded with the nanophotocatalyst and the degrading bacteria on the upper and lower surfaces, respectively, by using the tandem rod holder 4 and hollow elastic spacers 5, with the number of stacked layers being adjusted according to actual needs, preferably being 4-10 layers. During stacking, the materials loaded on the opposite surfaces of two adjacent plexiglass plates are ensured to be the same, and the photocatalytic degradation zone and the microbial degradation zone are present in a separate way in the decontamination support after assembly by stacking.

The support securement and interlayer spacing adjustment of step (5) includes: securing the plurality of the sequentially stacked plexiglass plates by connecting the fixing screws 6 with the thread interfaces 9 at the top end of the tandem rods 8, so as to form the nanophotocatalyst-microorganism composite multilayered light-transmitting combination support; and the interplate spacing can be achieved by adjusting the tightness of the fixing screws 6 as the hollow elastic spacers have flexibility.

Figure 6:
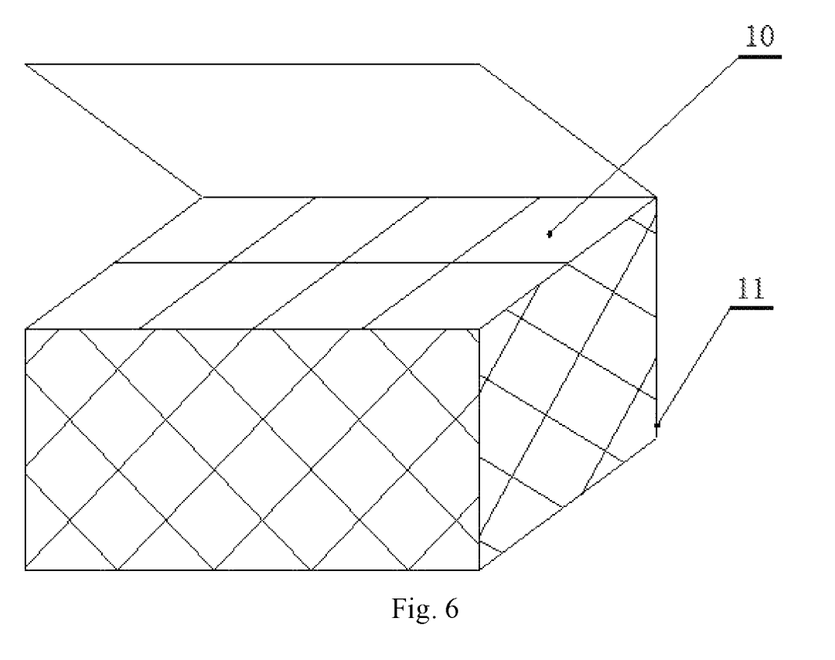
FIG. 6 is a schematic view showing the arrangement of the invention in a water-permeable cage.

When put into use, the nano-photocatalyst-microorganism composite multilayered light-transmitting combination support is arranged in the water-permeable cage 11 successively in two to four layers, and a plurality of the water-permeable cages 11 containing the nanophotocatalyst-microorganism composite multilayered light-transmitting combination supports are disposed in a certain manner at positions where organic pollutants need to be removed from water body, to achieve purification of water body.

The implementing procedures of the disclosure are described in detail below by reference to specific examples, which are intended to allow the skilled artisan to further understand the disclosure, but not to limit the disclosure in any way. It should be noted that several variations and modifications may be made by those of ordinary skill in the art without departing from the spirit and scope of the invention.

EXAMPLES

Example 1

Provided is a nano-photocatalyst-microorganism composite multilayered light-transmitting combination support, comprising: a plurality of wave-shaped plexiglass plates 1, a nanophotocatalyst-loading layer 2, a degrading bacteria-loading layer 3, a tandem rod holder 4, hollow elastic spacers 5, fixing screws 6, fixing holes 7, tandem rods 8, and thread interfaces 9; the plurality of wave-shaped plexiglass plates 1 are arranged in parallel and each wave-shaped plexiglass plate is provided with four fixing holes 7; the tandem rod holder 4 is provided with four tandem rods 8, which pass through the corresponding fixing holes 7 in each of the wave-shaped plexiglass plates 1 arranged in parallel, respectively; the tandem rod 8 between two adjacent wave-shaped plexiglass plates 1 passes through the hollow elastic spacers 5; each of the tandem rods 8 is connected to a fixing screw 6 at the top end; and each of the wave-shaped plexiglass plates 1 has different loading layers on the upper and lower surfaces, with a nanophotocatalyst-loading layer 2 on one surface and a degrading bacteria-loading layer 3 on the other surface.

The opposite surfaces of two adjacent wave-shaped plexiglass plates 1 have the same loading layers. A photocatalytic degradation zone is formed between two opposite nanophotocatalyst-loading layers 2, and a microbial degradation zone is formed between two opposite degrading bacteria-loading layers 3. After assembly by stacking, the photocatalytic degradation zone and the microbial degradation zone are present in a separate way throughout the nanophotocatalyst-microorganism composite multilayered light-transmitting combination support.

Each of the tandem rods 8 has a thread interface 9 at the top end, through which the fixing screw 6 is fixed to the top end of the tandem rod 8.

A method of making the nanophotocatalyst-microorganism composite multilayered light-transmitting combination support includes the steps of:

(1) hot press molding and surface roughening of plexiglass plate;

(2) formation of a nano-photocatalyst-loading layer 2 by loading two layers of films;

(3) formation of a degrading bacteria-loading layer 3 by loading degrading bacteria;

(4) assembly by stacking of multiple layers of plexiglass plates; and (5) support securement and interlayer spacing adjustment.

The hot press molding and surface roughening of plexiglass plate of step (1) includes: hot pressing a plexiglass plate in a wave-shaped mold at 90° C. into a wave-shaped shape; cutting the plexiglass plate into wave-shaped plexiglass plate square pieces with a length of 30 cm and a width of 30 cm; roughening by sand blasting the upper and lower surfaces of the wave-shaped plexiglass plate square pieces such that the surface roughness Rd is in a range of 0.8 to 3.2 µm; and cutting the wave-shaped plexiglass plate square pieces roughened by sandblasting at the four corners into circular fixing holes 7.

The formation of a nanophotocatalyst-loading layer by loading two layers of films of step (2) includes: ultrasonically cleaning the roughened wave-shaped plexiglass plate square pieces in 2% dilute nitric acid, absolute ethanol and pure water successively at an ultrasonic frequency of 40 KHz and at a temperature of 35° C., each for 20 min; air drying the ultrasonically-cleaned wave-shaped plexiglass plate square pieces at room temperature; and then applying a layer of $SiO_2$ with a thickness of 0.5 mm on one surface of the wave-shaped plexiglass plate square pieces by mechanical painting to increase the adhesion intensity of the nanophotocatalyst followed by applying a nano-photocatalyst on the wave-shaped plexiglass plate square pieces at normal temperature and pressure by three consecutive surface paintings prior to rinsing with water and drying at room temperature.

The formation of a degrading bacteria-loading layer 3 by loading degrading bacteria of step (3) includes: preparing a liquid medium, cultivating the selected degrading bacteria on a large scale, collecting the degrading bacteria by centrifugation at 2000 rpm for 10 min, mixing uniformly the degrading bacteria with a fixing agent at a mass-to-volume ratio of 1:10 (namely, adding 1 g (bacterial fresh weight) of the degrading bacteria into 10 ml of the fixing agent), and loading the degrading bacteria on the other surface of the wave-shaped plexiglass plate square pieces through 3 consecutive surface paintings prior to drying at room temperature, wherein the degrading bacteria are selected according the organic pollutants actually targeted.

The assembly by stacking of multiple layers of plexiglass plates of step (4) includes: assembling by stacking 6 layers of the wave-shaped plexiglass plate square pieces loaded with a nanophotocatalyst-loading layer 2 and a degrading bacteria-loading layer 3 on the upper and lower surfaces, respectively, by using a tandem rod holder 4 and hollow elastic spacers 5. During stacking, the materials loaded on the opposite surfaces of two adjacent plexiglass plates are ensured to be the same, and the photocatalytic degradation zone and the microbial degradation zone are present in a separate way in the decontamination support after assembly by stacking.

The support securement and interlayer spacing adjustment of step (5) includes: securing the 6 layers of the wave-shaped plexiglass plate square pieces as sequentially stacked by connecting the fixing screws 6 with the thread interfaces 9 at the top end of the tandem rods 8, so as to form the nano-photocatalyst-microorganism composite multilayered light-transmitting combination support; and the interpolate spacing can be achieved by adjusting the tightness of the fixing screws 6, as the hollow elastic spacers 5 have flexibility.

Example 2

Provided is a nanophotocatalyst-organic agricultural chemical-degrading bacteria composite multilayered light-transmitting combination support, wherein the nanophotocatalyst is anatase $TiO_2$ nanoparticles, the organic agricultural chemical-degrading bacteria are organophosphorus agricultural chemical chlorpyrifos-degrading bacteria *Sphingomonas* sp. Dsp-2, and the multilayered light-transmitting combination support has wave-shaped plexiglass plates as loading substrates. The method of making the support particularly includes steps of:

(1) hot press molding and surface roughening of plexiglass plate: a plexiglass plate with a length of 1.2 m, a width of 1.2 m and a thickness of 3 mm was hot pressed at 90° C. in a wave-shaped mold; the molded wave-shaped plexiglass plate was cut into square pieces with a length of 30 cm and a width of 30 cm, the upper and lower surfaces of the wave-shaped plexiglass plate 1 were roughened by sandblasting to have a surface roughness Rd of 1.6 µm, and then the square pieces were cut at the four corners (at a position of 5 cm perpendicularly apart from the adjacent edges) into 4 circular fixing holes 7 having a diameter of 1 cm.

(2) Nano-photocatalyst loading: the roughened wave-shaped plexiglass plates were ultrasonically cleaned in 2% dilute nitric acid, absolute ethanol and pure water successively at an ultrasonic frequency of 40 KHz and at a temperature of 35° C., each for 20 min, prior to air drying at room temperature.

(3) Preparation of $SiO_2$ sol by sol-gel method: A dilute aqueous HCl solution was uniformly and slowly added dropwise to a solution of tetraethyl ortho silicate in ethanol under stirring using a magnetic stirrer at a rotation speed of 1000 rpm, with a molar ratio of absolute ethanol, HCl and tetraethyl ortho silicate of 2:4:0.05. The mixture solution was refluxed at a constant temperature of 70° C. under stirring at 300 rpm for 3 h, sealed, and left in an oven at 33° C. for 24 h to obtain a $SiO_2$ sol. The $SiO_2$ sol was evenly coated by screen printing at normal temperature and pressure on the wave-shaped plexiglass loading substrate in a thickness of 0.5 mm, and dried at room temperature.

(4) Preparation of anatase $TiO_2$ sol by sol-gel method: A solution of the precursor n-butyl titanate in isopropanol was uniformly added dropwize to a dilute aqueous nitric acid solution with a pH of 2.5 under stirring using a magnetic stirrer at a rotation speed of 1000 rpm. The molar ratio of nitric acid to n-butyl titanate was 76:1.42. The mixed solution was refluxed at a constant temperature of 75° C. under stirring (at 300 rpm) for 24 hours, and then was subjected to rotary evaporation to remove the alcohol and finally obtain a milky anatase $TiO_2$ sol. The $TiO_2$ sol was evenly coated on the $SiO_2$ coating layer by screen printing at normal temperature and pressure for 3 times. After drying at room temperature, an anatase $TiO_2$ nanoparticle-loading layer was formed on the wave-shaped plexiglass loading substrate.

(5) Degrading bacteria loading: chlorpyrifos-degrading bacteria *Sphingomonas* sp. Dsp-2 was firstly cultivated on a large scale. Namely, the *Sphingomonas* sp. Dsp-2 strain was seeded in 4 L of the LB medium containing 10 g/L of tryptone, 5 g/L of yeast extract and 10 g/L of sodium chloride and having a pH of 7.0. The cultivation was carried out on a shaker at a shaking speed of 200 rpm at a culture temperature of 30° C. The absorbance OD600 was measured with a spectrophotometer for detecting the growth of the degrading bacteria. Once the growth reached the plateau phase, the degrading bacteria was collected by centrifugation at 2000 rpm for 10 min. The collected degrading bacteria were uniformly mixed with a 2% sodium alginate solution at a mass-to-volume ratio of 1:10 (namely 1 g (bacterial fresh weight) of the collected degrading bacteria was added to 10 ml of the 2% sodium alginate solution) to prepare a degrading bacteria-fixing solution.

(6) Preparation of 5% $CaCl_2$ solution. A 5% $CaCl_2$ solution was uniformly coated on the other surface of the wave-shaped plexiglass loading substrate corresponding to the anatase $TiO_2$ nanoparticle-loading layer by screen printing at normal temperature and pressure. The coating thickness was not limited as long as the surface is coated with the 5% $CaCl_2$ solution and wet. Then, the degrading bacteria fixing solution was further applied at a thickness of 0.5 mm on the coating layer of the 5% $CaCl_2$ solution, and crosslinked by calcification for 4 h. The coating processes of the $CaCl_2$ solution and the degrading bacteria-fixing solution were repeated for twice more. After drying at room temperature, an organophosphorus agricultural chemical chlorpyrifos-degrading bacteria *Sphingomonas* sp. Dsp-2-loading layer was formed on the wave-shaped plexiglass loading substrate.

(7) Assembly by stacking of Multilayers of plexiglass plates: Four tandem rods 8 on the tandem rod holder 4 were allowed to pass through the circular fixing holes 7 at the four corners of the wave-shaped plexiglass plate loaded with tanatase TiO2 nanoparticles and the organophosphorus agricultural chemical chlorpyrifos-degrading bacteria *Sphingomonas* sp. Dsp-2 on the two surfaces, respectively, and then to pass through four hollow elastic spacers 5, respectively. Then the second wave-shaped plexiglass plate was stacked. During stacking, attention is drawn to the direction so as to ensure the materials on the opposite surfaces of two adjacent plates to be the same. The above steps were repeated to sequentially stack 6 layers in total, wherein two adjacent layers were separated by the hollow elastic spacers 5, to ensure that the photocatalytic degradation zone and the microbial degradation zone are present in a separate way in the decontamination support after assembly by stacking.

(8) Interlayer spacing adjustment and support securement: the plurality of loading plexiglass plates, upon sequentially stacked, were secured by connecting fixing screws 6 to thread interfaces 9 at the top of the tandem rods 8, thereby forming a nano-photocatalyst-microorganism composite multilayered light-transmitting combination support. The tightness of the fixing screws 6 was adjusted such that the interlayer spacing is 1.5 cm.

When put into use, a plurality of anatase $TiO_2$ nanoparticle-chlorpyrifos-degrading bacteria *Sphingomonas* sp. Dsp-2 composite multilayered light-transmitting combination supports were placed in the water-permeable cage 11 in two layers. When water needs to be drained from the rice fields, 10 water-permeable cages 11 equipped with the decontamination supports were placed symmetrically at an interval of 2 m in first-stage drainage ditch of the rice fields. The chlorpyrifos in water body was degraded by photocatalysis when flowing through the photocatalytic degradation zone of the composite multilayered light-transmitting combination supports, and degraded by the chlorpyrifos degrading-bacteria *Sphingomonas* sp. Dsp-2 in the microbial degradation zone. The photocatalytic degradation and the microbial degradation functioned simultaneously to reduce agricultural chemical residues in water body. When the photocatalytic performance or the activity of the degrading bacteria was reduced after the decontamination support has been used for a period of time, the support can be disassembled, washed and reloaded with anatase $TiO_2$ nanoparticles and organophosphorus agricultural chemical chlorpyrifos-degrading bacteria *Sphingomonas* sp. Dsp-2. The support can be assembled and secured again for recycling use, which reduces the cost, improves the remediation effect, and has a good application prospect of controlling non-pointed source pollution of agricultural organic chemicals.

Example 3

Provided is a nano-photocatalyst-microorganism composite multilayered light transmitting combination support, wherein the nanophotocatalyst is anatase $TiO_2$ nanoparticles, the microorganism is a microbial population indigenous in water environment, and the multilayered light-transmitting combination support uses wave-shaped plexiglass as loading substrate. In the method of making the same, the steps such as hot press molding and surface roughening of plexiglass plate, nano-photocatalyst loading, assembly by stacking of multilayers of plexiglass plates and interlayer spacing adjustment and support securement were the same as those described in Example 1. For degrading bacteria loading, no specific degrading bacteria were loaded on either surface of the plexiglass plate in this example. Instead, 2% agar was uniformly applied successively for three times, with a layer thickness of 0.5 mm. After solidified at room temperature, the steps of assembly by stacking, interlayer spacing adjustment and support securement were carried out. The contamination supports were arranged in a water-permeable cage in two layers for purification of water in rivers heavily polluted by organic pollutants. 40 water-permeable cages 11 equipped with decontamination supports were fixed respectively to the bank slope and the central area of the river, and thus the river has a length of 50 m to be remediated. After a period of time, the indigenous microorganisms attached to the surface of the solidified agar and formed a biofilm, which forms a microbial degradation zone. The pollutants in the polluted water body were degraded by photocatalysis when flowing through the photocatalytic degradation zone of the composite multilayered light-transmitting combination support, and degraded by the biofilm in the microbial degradation zone. The photocatalytic degradation and the indigenous microbial degradation were utilized in combination, leading to finally achieve the purpose of water purification.

The biofilm-forming microorganisms attached to the plexiglass plate are indigenous bacteria, which not only can degrade the organic pollutants, but also can remove pollution of nitrogen and phosphorus nutrient salts, and will not cause secondary pollution due to the use of the external degrading bacteria. This support fully fulfills the degradation potential of indigenous microorganisms in the photocatalytic environment and is a green, environmentally friendly and sustainable decontamination support.

The invention claimed is:

1. A method of making a nano-photocatalyst-microorganism composite multilayered light-transmitting combination support, the nano-photocatalyst-microorganism composite multilayered light-transmitting combination support comprising: multiple layers of wave-shaped plexiglass plate square pieces, a tandem rod holder, hollow elastic spacers, and fixing screws; wherein the multiple layers of wave-shaped plexiglass plate square pieces are arranged in parallel and each of the wave-shaped plexiglass plate square pieces is provided with four fixing holes; the tandem rod holder is provided with four tandem rods, and the four tandem rods pass through corresponding fixing holes in each of the wave-shaped plexiglass plate square pieces arranged in parallel, respectively; the tandem rods between two adjacent wave-shaped plexiglass plate square pieces pass through the hollow elastic spacers; each of the tandem rods is provided with a fixing screw at the top end; and each of the wave-shaped plexiglass plate square pieces has different loading layers on the upper and lower surfaces, with a nano-photocatalyst-loading layer on one surface and a degrading bacteria-loading layer on the other surface; and the method comprising:

(1) hot press molding and surface roughening of a raw plexiglass plate, comprising: hot pressing the raw plexiglass plate in a wave-shaped mold into a wave shape; cutting the raw plexiglass plate into wave-shaped plexiglass plate square pieces; roughening by sandblasting the upper and lower surfaces of the wave-shaped plexiglass plate square pieces; and cutting the wave-shaped plexiglass plate square pieces roughened by sandblasting to have circular fixing holes at the four corners;

(2) formation of the nano-photocatalyst-loading layer by loading two layers of films, comprising: ultrasonically cleaning the roughened wave-shaped plexiglass plate square pieces with dilute nitric acid, absolute ethanol and pure water sequentially at an ultrasonic frequency of 40 KHz and at a temperature of 35° C., each for 20 min; air drying the ultrasonically-cleaned wave-shaped plexiglass plate square pieces at room temperature; and then applying a layer of $SiO_2$ on one surface of each wave-shaped plexiglass plate square piece by mechanical painting to increase the adhesion intensity of the nano-photocatalyst followed by applying a nano-photocatalyst on the one surface of each wave-shaped plexiglass plate square piece at normal temperature and pressure by three or more consecutive surface paintings, prior to rinsing with water and air drying at room temperature;

(3) formation of the degrading bacteria-loading layer by loading degrading bacteria;

(4) assembly by stacking the multiple layers of the plexiglass plate square pieces; and (5) support securement and interlayer spacing adjustment.

2. The method of making the nano-photocatalyst-microorganism composite multilayered light-transmitting combination support according to claim 1, wherein the formation of the degrading bacteria-loading layer by loading degrading bacteria of step (3) comprises: preparing a liquid medium, expanding a cultivation of selected degrading bacteria; collecting the degrading bacteria by low-speed centrifugation for 5 min to 15 min; mixing uniformly the degrading bacteria and a fixing agent at a mass-to-volume ratio of 1:10; and loading the degrading bacteria on the other surface of each of the wave-shaped plexiglass plate square pieces through three or more consecutive surface paintings prior to drying at room temperature.

3. The method of making the nano-photocatalyst-microorganism composite multilayered light-transmitting combination support according to claim 1, wherein in the condition that the degrading bacteria is an indigenous microbial flora, which remove pollutants with its self-remediation ability, the other surface of each of the plexiglass plate square pieces is selected to be coated with a single layer of a fixing agent, and after the multiple layers of the plexiglass plate square pieces are assembled by stacking and placed in a water body, the indigenous microbial flora adhere to the fixing agent, grow and form a biofilm, thereby degrading pollutants in the water body.

4. The method of making the nano-photocatalyst-microorganism composite multilayered light-transmitting combination support according to claim 1, wherein, the assembly by stacking the multiple layers of the plexiglass plate square pieces of step (4) comprises: assembling by stacking the multiple layers of the plexiglass plate square pieces loaded with the nano-photocatalyst and the degrading bacteria on the upper and lower surfaces, respectively, by using the tandem rod holder and hollow elastic spacers, with the number of stacked layers being adjusted according to actual needs; during stacking, the layers loaded on opposite surfaces of two adjacent plexiglass plate square pieces are ensured to be the same, and a photocatalytic degradation zone and a microbial degradation zone are present in a separate way in the combination support after assembly by stacking.

5. The method of making the nano-photocatalyst-microorganism composite multilayered light-transmitting combination support according to claim 1, wherein the support securement and interlayer spacing adjustment of step (5) comprises: securing the multiple layers of the plexiglass plate square pieces as stacked by connecting the fixing screws with thread interfaces at the top end of the tandem rods, so as to form the nano-photocatalyst-microorganism composite multilayered light-transmitting combination support, and the interlayer spacing is achieved by adjusting tightness of the fixing screws as the hollow elastic spacers have flexibility.

* * * * *